US006986039B1

(12) United States Patent
Leah et al.

(10) Patent No.: US 6,986,039 B1
(45) Date of Patent: *Jan. 10, 2006

(54) TECHNIQUE FOR SYNCHRONIZING SECURITY CREDENTIALS USING A TRUSTED AUTHENTICATING DOMAIN

(75) Inventors: Robert C. Leah, Cary, NC (US); John Ryan McGarvey, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 826 days.

This patent is subject to a terminal disclaimer.

(21) Appl. No.: 09/614,087

(22) Filed: Jul. 11, 2000

(51) Int. Cl.
*H04L 9/00* (2006.01)

(52) U.S. Cl. ............ 713/155; 713/161; 713/169; 713/170; 713/184; 713/201; 713/202; 380/274; 709/206; 709/246

(58) Field of Classification Search .......... 713/55, 713/161, 169, 170, 183–184, 200–202, 155; 380/274; 705/72, 76, 8; 707/1; 709/206, 709/246
See application file for complete search history.

(56) References Cited

U.S. PATENT DOCUMENTS

| | | | |
|---|---|---|---|
| 5,719,941 A * | 2/1998 | Swift et al. ............... 713/155 |
| 5,838,903 A * | 11/1998 | Blakely et al. ............ 713/202 |
| 5,862,323 A | 1/1999 | Blakley, III et al. ..... 395/188.01 |
| 5,867,646 A | 2/1999 | Benson et al. ............. 395/186 |
| 5,913,025 A | 6/1999 | Higley et al. ........... 395/187.01 |
| 5,944,824 A | 8/1999 | He ............................ 713/201 |
| 6,173,400 B1 * | 1/2001 | Perlman et al. ............. 713/172 |
| 6,240,184 B1 * | 5/2001 | Huynh et al. ................ 380/206 |
| 6,292,904 B1 * | 9/2001 | Broomhall et al. ............ 714/1 |
| 6,615,258 B1 * | 9/2003 | Barry et al. ................. 709/223 |
| 6,647,393 B1 * | 11/2003 | Dietterich et al. .......... 707/102 |
| 6,675,161 B1 * | 1/2004 | Suchter ........................ 707/5 |

OTHER PUBLICATIONS

IBM Technical Disclosure Bulletin, vol. 38, No. 09 Sep. 1995, "Partial Containment Structure for Inegration of Distributed Computing Environment and Local Registries" pp 535-538.

* cited by examiner

*Primary Examiner*—Kim Vu
*Assistant Examiner*—Tongoc Tran
(74) *Attorney, Agent, or Firm*—Marcia L. Doubet (57) ABSTRACT

The present invention provides a method, system, and computer program product for synchronizing security credentials of users and/or groups of users between directories, operating system platforms, and/or registries. A user's security credentials at a master registry are to be securely set (or reset). To ensure that the user has the required permission for this operation, the user is first authenticated with a trusted authenticating domain. The authenticating domain may be identified by the user, or the identification of the domain may be obtained from the master registry. The master registry may store an identification of the authenticating domain on a per-user basis, or for groups of users, or for the master registry as a whole. The credentials may be propagated to other registries, in addition to the master. This technique enables synchronizing multiple copies of a user's security credentials without requiring access to a plaintext version thereof, and without forcing the credentials to a new value as part of the synchronization process.

34 Claims, 6 Drawing Sheets

TECHNIQUE FOR SYNCHRONIZING SECURITY CREDENTIALS USING A TRUSTED AUTHENTICATING DOMAIN

The present invention is related to U.S. Ser. No. 09/613,983, titled "Technique for Synchronizing Security Credentials from a Master Directory, Platform, or Registry", which is commonly assigned to the International Business Machines Corporation and which was filed concurrently herewith on Jul. 11, 2000.

FIELD OF THE INVENTION

The present invention relates to computer security, and deals more particularly with a method, system, and computer program product for synchronizing security credentials of users and/or groups of users between directories, operating system platforms, and/or registries.

DESCRIPTION OF THE RELATED ART

It is common to have several user registries for an enterprise, and larger enterprises may have hundreds of them. "Registry", as used herein, refers to both directories and other types of user registries (including operating system registries), wherein various types of information about users is persistently stored. Examples of user registries include the Secure Way® directory from the International Business Machines Corporation ("IBM") and Domino™ 5 directory from the Lotus Development Corporation ("Lotus"). Examples of operating system registries include the Microsoft® Windows NT® domain Security Accounts Manager database and the OS/390® RACF® product from IBM. (RACF® is an IBM licensed program that provides access control by identifying users to a system, and verifying those users; authorizing access to protected resources; etc. "SecureWay", "OS/390", and "RACF" are registered trademarks of IBM. "Domino" is a trademark of Lotus. "Microsoft" and "Windows NT" are registered trademarks of Microsoft Corporation.)

The information stored about users in registries of this type typically includes the user's identification (using, for example, a relatively short user identifier or "user ID" which may be associated with the user's actual name), password or other type of security credential, and access privileges (referred to equivalently herein as "permission"), and may contain other information such as the user's preferences for various aspects of his or her system., The term "password" will be used hereinafter to refer to whatever type of security credential(s) or shared secret(s) are required to be known to the user (or other authenticating principal, such as a systems administrator or authenticating server) and registry for purposes of authenticating the user with the registry, whether it is an actual password, a personal identification number (PIN), a security token of some type, or other similar information (including stored biometric information such as a retinal scan or fingerprint).

As businesses increasingly open their corporate information technology assets to use by non-employees—for example, by enabling consumers and other businesses to enter into e-commerce transactions—the number of registries and the amount of information stored in the will continue to increase. At the same time, the efficiency of accessing a system's registries to locate and verify a user's permissions becomes of even more importance as a discriminating factor among competing businesses. As registries proliferate, it is desirable to keep the information stored in them synchronized. This enables the administrative burden of maintaining the directories to be minimized, while at the same time reducing the amount of system overhead required to authenticate a system's users in order to provide those users with widespread access to the applications which they are authorized to use.

One type of registry synchronization tool which is known in the art is referred to as a "meta-directory". A meta-directory is logically a directory of directories. Meta-directory tools keep user registries and directories synchronized with one or more central directories. A central directory uses agent technology or various directory access protocols to interrogate the contents of the user registries and directories, and then joins them into a single logical view. The result of this operation is then used to update the contents of each individual directory or registry, so that the information in each matches the information in the central directory. Examples of such tools include the InJoin™ Meta-Directory from Critical Path, Inc., and the DirXML product from Novell, Inc. Other tools, in addition to meta-directory software, provide similar techniques to synchronize user IDs (and sometimes other information) between various registries and directories. ("InJoin" is a trademark of Critical path, Inc.).

A problem with existing synchronization tools is that they often fail to synchronize the security credentials of the users, and in particular, the existing user password values. This is because most registries provide no programmatic means of discovering a user password value: thus, it is not possible for the existing password value to be retrieved from the registry and preserved when the registered information is propagated to other registries. Instead, the synchronization tool may simply ignore the existing password value, and propagate the remaining information, thereby synchronizing all information except for the password. Or, the synchronization tool may enable a system administrator to force each user password to some new value, where this new value is then propagated (along with the user's other registered information) to the other registries being synchronized. Either approach is unsatisfactory. In the former case, the user cannot be authenticated for system access any more efficiently than before the propagation, because the stored password remains stored in the single, original directory. To solve this problem, the system administrator must define a new password for the user in each registry to which the user's information has been propagated, leading to the same problem as in the latter cased discussed above. The problem with this latter case is that the user now has access permissions which are protected using a password which the user doesn't know. The new password value must be communicated to the user before the user can access the protected resources associated with that password. As will be obvious, this can be a huge administrative burden when the information for many users is being propagated. Furthermore, distribution of the password value may introduce security exposures into the system.

Maintaining the user's original password is required in order that the user's access to protected resources continues to function seamlessly and without interruption after the propagation of security credentials among registries. If the user is accustomed to typing in a particular ID and password value to access some protected resource, that same ID and password value need to be reflected in all propagated copies of that user's access permissions for the resource so that the user can continue to use (and remember) his or her original ID and password. It is not possible to simply copy an area of storage in a registry where a user's password is stored, and then use that as the user's password in an outgoing replication message. This is because the passwords are not typically stored in a recoverable form. Rather, a version of the password which has been cryptographically transformed, for example by applying a one-way hashing function to the original password, is stored as a hexadecimal value. While computation of the transformed value can be repeated for purposes of authenticating the user (i.e. by obtaining the user's password from the user again, recomputing the hash, and then comparing this new hash value to the stored hexadecimal value), the one-way property of the hashing algorithm makes it computationally infeasible to recover the password from the stored hexadecimal value. Propagating this stored hexadecimal value does not provide a general solution for synchronization of the user's password among registries, because each directory uses its own hashing algorithm (unless the directory software is identical) and thus would be unable to generate a hash value from a given input user ID which would match the stored value which was previously computed by a different registry. Some directories may encrypt passwords prior to storing them, rather than using a hashing function, where the encryption key that is used is then separately stored so that a decryption process can be applied to recover the original password value. Directories of this type, however, make the key location secret so that only the directory itself can get the plaintext value of the password.

U.S. Pat. No. 5,867,646 to Benson et al., titled "Providing Secure Access for Multiple Processes Having Separate Directories", teaches a technique for enabling system users to access multiple processes within a system where each of the processes may have its own directory. A particular user may have a different user ID, and a different password value, in each directory. A cross-reference table is created to correlate the user's different IDs. After completing a secure log-on to a first process (e.g. the operating system), access to other processes is provided transparently—that is, without requiring a second security check—by consulting the cross reference table. (The possibility of using a second security desk is provided, however). The effect of this technique is to ignore the separately-stored password values for the subsequently-accessed systems (except in the case of the second security check). No password synchronization nor propagation technique is defined.

An article entitled "Partial Containment Structure for Inegration [sic] of Distributed Computing Environment and Local Registries" published in Volume 38, No. 9 (September 1995) of the IBM Technical Disclosure Bulletin ("TDB") describes a password synchronization technique which enables a single log-on. A user may have multiple IDs and passwords defined in local registries, and a different ID and password defined as a principal in a DCD (Distributed Computing Environment) registry. The technique which is described is very similar to that which has been described above for U.S. Pat. No. 5,867,646. Here, a mapping is created between the DCE principal ID and the one or more local user IDs, and this mapping is used to link the different identities of a particular user. The mapping is created as user IDs are extracted from local registries, and imported into the DCE registry. However, there is no teaching of importing the user's password(s) during this process, nor is there a discussion of whether such multiple passwords continue to be used following the import process. The TDB article does discuss synchronizing in terms of updating a user's locally-stored security information from the central DCE registry, but only in terms of subsequent changes which are made to a password. There are several shortcomings in the approach which is discussed. First, the user's original password is apparently ignored, with the resulting problems which have been previously described. There is also no discussion of how a password change initiated at a local system is to be intercepted, such that the updated value can be securely relayed to the central DCE registry. Finally, regardless of whether the password change is initiated in the DCE registry or in the local registry, it is unclear whether, or how, the password change process is authenticated to the other party (the local registry or DCE registry, respectively) unless the original passwords were the same to begin with. Thus, no solution is provided for synchronizing the original set of passwords.

U.S. Pat. No. 5,862,323 to Blakley et al., "Retrieving Plain-Text Passwords from a Main Registry by a Plurality of Foreign Registries", and related U.S. Pat. No. 5,832,211, also to Blakley et al., titled "Propagating Plain-Text Passwords from a Main Registry to a Plurality of Foreign Registries", teach a technique for password synchronization which adds a new attribute to a master registry (which is DCE, in the preferred embodiment), this new attribute being a plaintext password attribute. Most registries do not allow plaintext passwords to be stored, and secure registries do not allow retrieval of an existing password from the registry for creating a plaintext version thereof (as has been discussed above).

Accordingly, a need exists for a technique by which security credentials can be securely synchronized and propagated among multiple directories, operating system platforms, and registries.

SUMMARY OF THE INVENTION

An object of the present invention is to provide a technique for securely synchronizing and propagating security credentials among multiple directories, operating system platforms, and/or registries.

A further object of the present invention is to provide a technique whereby a user can securely replace his/her security credentials in one registry, even though he/she has forgotten the password value which was used when creating those previously-stored credentials.

Still another object of the present invention is to provide this technique such that the user is first authenticated with a trusted authenticating domain to ensure that the user has the required permission for initiating the synchronization process.

Another object of the present invention is to provide this technique whereby the original value of a user's security credentials (such as the user's password) is preserved and reflected in the propagation process, in a manner that enables seamless, uninterrupted operation for the user.

It is a further object of the present invention to provide this technique for registries which do not make stored security credential values (including stored password values) accessible, nor a plaintext version thereof.

Yet another object of the present invention is to provide this technique whereby a user's previously-existing distinct security credentials (such as the user's password values) for different resources continue to be used for protecting the corresponding resources.

Still another object of the present invention is to provide a technique which enables a user to initiate the secure synchronization of his/her own security credentials among multiple registries.

Other objects and advantages of the present invention will be set forth in part in the description and in the drawings which follow and, in part, will be obvious from the description or may be learned by practice of the invention.

To achieve the foregoing objects, and in accordance with the purpose of the invention as broadly described herein, the present invention provides a system, method, and computer program product for synchronizing security credentials of users and/or groups of users between directories, operating system platforms, and/or registries using a trusted authenticating domain. This technique comprises: establishing a secure connection between a client and a password synchronization agent (PSA); transmitting an identifier of a user and an identifying secret of the user to the PSA; validating the user with the trusted authenticating domain using the transmitted user identifier and identifying secret; and propagating the identifying secret of the user to a master registry if the validation succeeds.

As used in this document, the phrase "secure connection" implies two characteristics (1) data should be encrypted or otherwise protected for transmission over the network, and (2) the entity to which connection is made (in this case, the PSA to which the client connects) should provide information to the client that authenticates its identity and establishes it as a trusted party for password synchronization. The present invention can be implemented without the data protection described in (1) or without the authentication of the PSA to the client described in (2), and such an implementation would be within the scope of the present invention, but it would be unwise in many cases to deploy such an implementation. Without the data protection, a hostile party may intercept or modify the data (including the password or other shared secret), and without the authentication of the PSA to the client, a hostile party may impersonate the PSA and in so doing capture the user's password or other security secret. Several means of creating such a secure connection, with both data protection and authentication of the PSA to the client, are well known in the art, one example being use of the Secure Sockets Layer (SSL) protocol.

A second secure connection may be established between the PSA and the trusted authenticating domain, in which case this second secure connection is used for validating the user.

A third secure connection may be established between the PSA and the master registry, in which case this third secure connection is used for propagating the identifying secret to the master registry.

The identifying secret may optionally be propagated to one or more other target registries if the validation succeeds. Additional secure connections may be established between the PSA and each of the other target registries, in which case the additional secure connections are used for propagating the identifying secret to the other target registries.

Secure connections between the PSA and the trusted authenticating domain, secure connections between the PSA and the master registry, and any secure connection between the PSA and each target registry, should include both (1) protection of the data over the network and (2) authentication of the trusted authenticating domain, the master registry, and each target registry to the PSA, using SSL or other means well known in the art. The use of secure connections is not strictly necessary to the implementation of the invention, and may be omitted if a user of the invention is otherwise assured of the security of the network, but in the general case it is unwise to omit either data protection or authentication of each of the registries. The trusted authenticating domain, the master registry, and the target registries are, in this case, the entities to which a secure connection is made.

An identification of the trusted authenticating domain may be obtained from the user, in which case the master registry verifies that the trusted authenticating domain is trusted as a prerequisite to the propagating. Or, an identification of the trusted authenticating domain may be obtained from the master registry, or from another trusted source. The master registry may store trust policy information. If so, the trust policy information stored for the user, or for a user group of which the user is a member, is preferably used to determine whether the authenticating domain identified by the user or master registry is trusted.

The master may store password synchronization policy information, and the propagation of the identifying secret to other target registries may further comprise identifying the other target registries using the stored password synchronization policy information for the user or for a user group of which the user is a member. When synchronizing credentials using a trusted authenticating domain, the master registry is the source for all policies concerning which authenticating domains are to be trusted and which other registries are to be targets for replication of security credentials, and also contains information indicating which policies apply to individual users within the master registry, which apply to collections of users, and which apply to the master registry as a whole. While the master registry contains policy information, it might contain no information sufficient to authenticate the user, prior to the operation of the synchronization techniques herein described, and therefore the mechanism is dependent on one or more trusted authenticating domains, separate from the master registry.

The validation may further comprise: performing a security function on the identifying secret of the user, wherein the security function comprises one of (i) a one-way hashing algorithm or (ii) an encryption algorithm; using the user identifier to locate a previously-stored identifying secret of the user which was stored by the trusted authenticating domain; and comparing the located identifying secret to a result of performing the security function.

Alternatively, the validation may further comprise use of the native authentication mechanisms of the trusted authenticating domain. For example, in the case where an LDAP directory is the trusted authenticating domain, the native authentication mechanism is an authenticated LDAP bind. With this approach, a PSA may be created without having any knowledge of the specific hashing or encryption algorithm used by the trusted authenticating domain and applied by it to the user's password or other security secret. With this approach, all such mechanism are applied to the user's security secret within the normal operation of the trusted authenticating domain.

The PSA may have administrative authority for performing operations at the master registry, and at the one or more other target registries.

The present invention will now be described with reference to the following drawings, in which like reference numbers denote the same element throughout.

DESCRIPTION OF THE PREFERRED EMBODIMENTS

Figure 1:
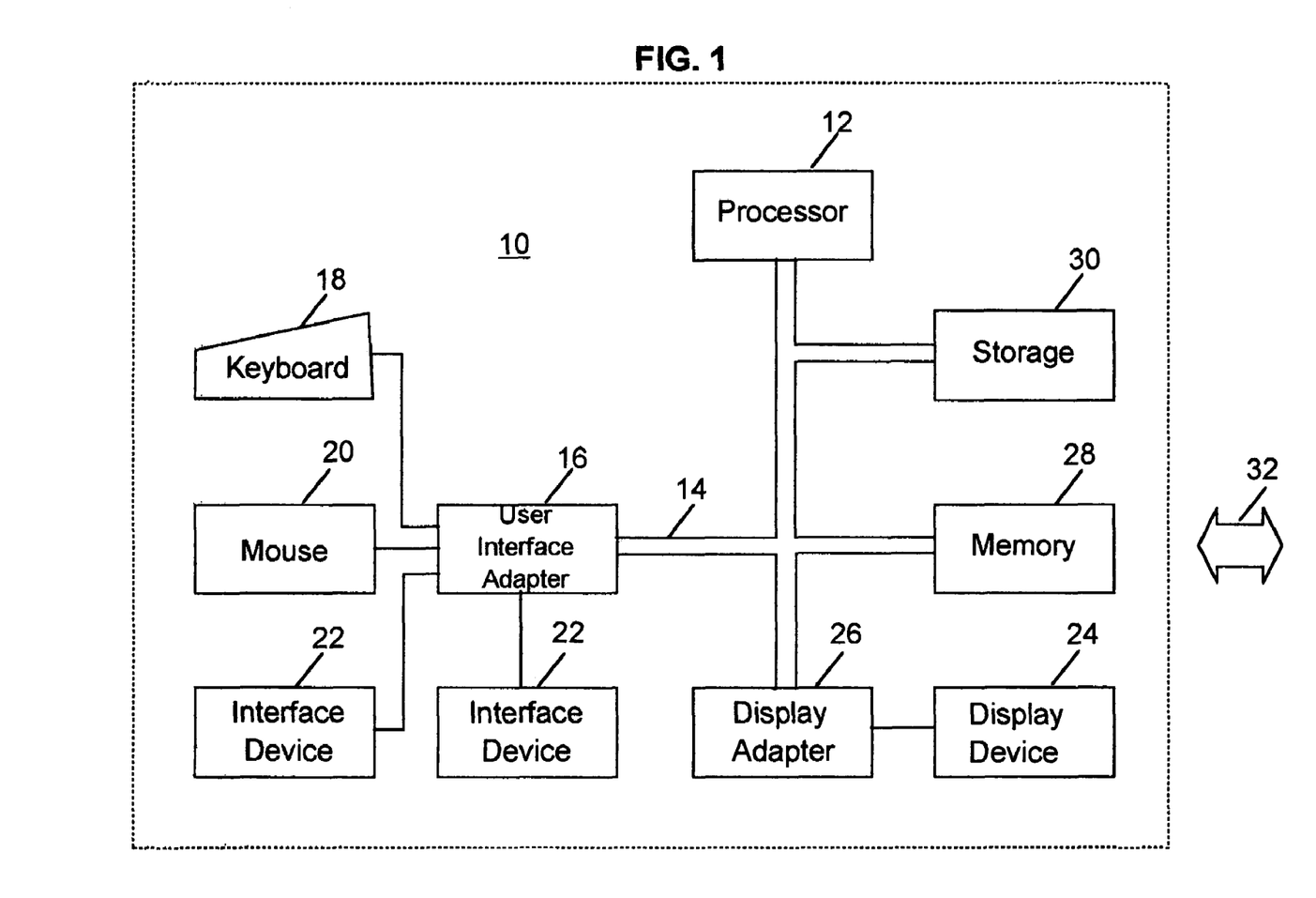
FIG. 1 is a block diagram of a computer workstation environment in which the present invention may be practiced.

FIG. 1 illustrates a representative workstation hardware environment in which the present invention may be practiced. The environment of FIG. 1 comprises a representative single user computer workstation 10, such as a personal computer, including related peripheral devices. The workstation 10 includes a microprocessor 12 and a bus 14 employed to connect and enable communication between the microprocessor 12 and the components of the workstation 10 in accordance with known techniques. The workstation 10 typically includes a user interface adapter 16, which connects the microprocessor 12 via the bus 14 to one or more interface devices, such as a keyboard 18, mouse 20, and/or other interface devices 22, which can be any user interface device, such as a touch sensitive screen, digitized entry pat, etc. The bus 14 also connects a display device 24, such as an LCD screen or monitor, to the microprocessor 12 via a display adapter 26. The bus 14 also connects the microprocessor 12 to memory 28 and long-term storage 30 which can include a hard drive, diskette drive, tape drive, etc.

The workstation 10 may communicate with other computers or networks of computers, for example via a communication channel or modem 32. Alternatively, the workstation 10 may communicate using a wireless interface at 32, such as a CDPD (cellular digital packet data) card. The workstation 10 may be associated with such other computers in a local area network (LAN) or a wide area network (WAN), or the workstation 10 can be a client in a client/server arrangement with another computer, etc. All of these configurations, as well as the appropriate communications hardware and software, are known in the art.

Figure 2:
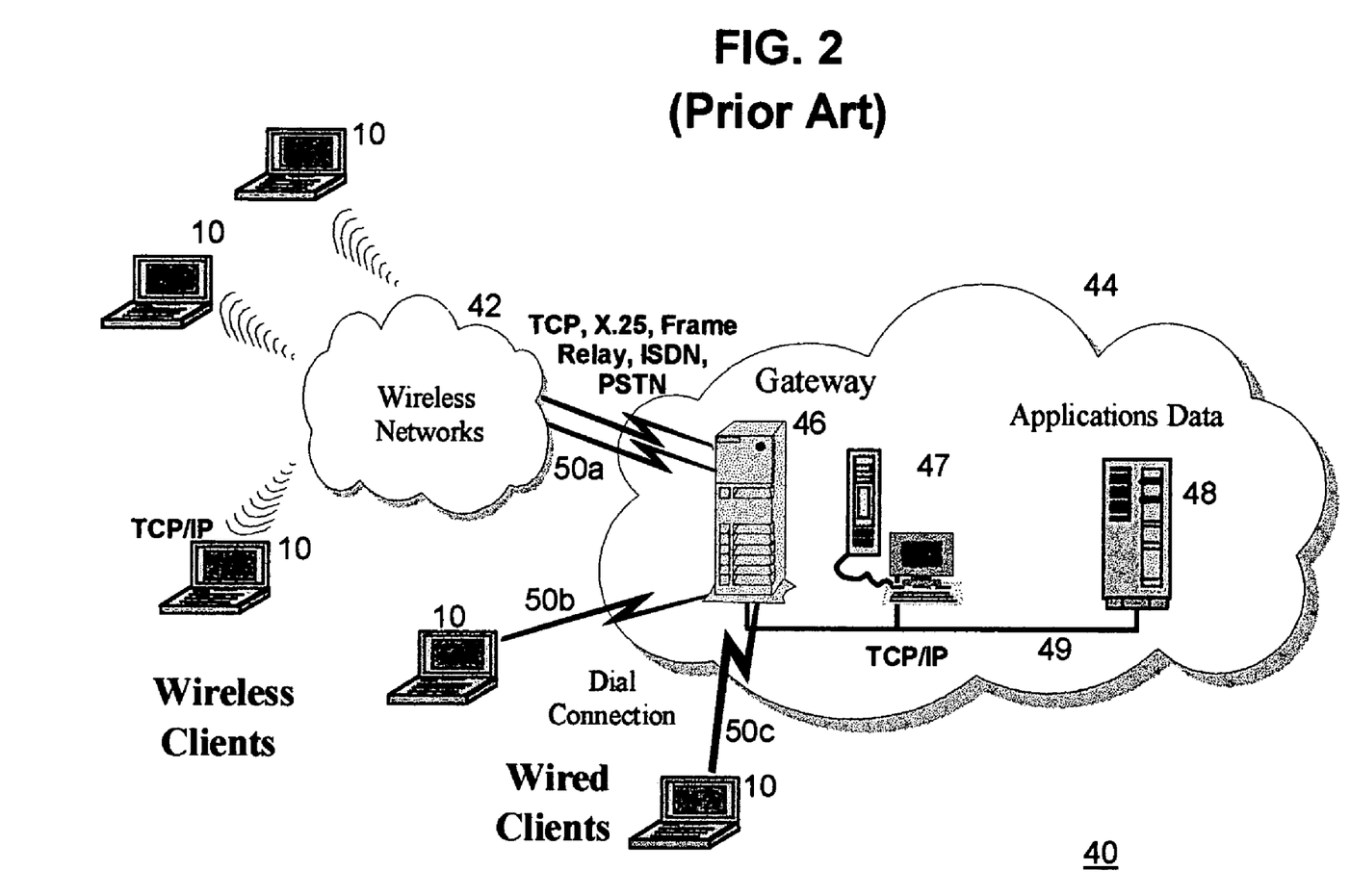
FIG. 2 is a diagram of a networked computing environment in which the present

FIG. 2 illustrates data processing network 40 in which the present invention may be practiced. The data processing network 40 may include a plurality of individual networks, such as wireless network 42 and network 44, each of which may include a plurality of individual workstations 10. Additionally, as those skilled in the art will appreciate, one or more LANs may be included (not shown), where a LAN may comprise a plurality of intelligent workstations coupled to a host processor.

Still referring to FIG. 2, the networks 42 and 44 may also include mainframe computers or servers, such as a gateway computer 46 or application server 47 (which may access a data repository 48). A gateway computer 46 serves as a point of entry into each network 44. The gateway 46 may be preferably coupled to another network 42 by means of a communication link 50a. The gateway 46 may also be directly coupled to one or more workstations 10 using a communications link 50b, 50c. The gateway computer 46 may be implemented utilizing an Enterprise Systems Architecture/370 available from IBM, an Enterprise Systems Architecture/390 computer, etc. Depending on the application, a midrange computer, such as an Application System/400 (also known as an AS/400) may be employed. ("Enterprie Systems Architecture/370" is a trademark of IBM; "Enterprise Systems Architecture/390", "Application System/400", and "AS/400" are registered trademarks of IBM.)

The gateway computer 46 may also be coupled 49 to a storage device (such as data repository 48). Further, the gateway 46 may be directly or indirectly coupled to one or more workstations 10.

Those skilled in the art will appreciate that the gateway computer 46 may be located a great geographic distance from the network 42, and similarly, the workstations 10 may be located a substantial distance from the networks 42 and 44. For example, the network 42 may be located in California, while the gateway 46 may be located in Texas, and one or more of the workstations 10 may be located in New York. The workstations 10 may connect to the wireless network 42 using a networking protocol such as the Transmission Control Protocol/Internet Protocol ("TCP/IP") over a number of alternative connection media, such as cellular phone, radio frequency networks, satellite networks, etc. The wireless network 42 preferably connects to the gateway 46 using a network connection 50a such as TCP or UDP (User Datagram Protocol) over IP, X.25, Frame Relay, ISDN (Integrated Services Digital Network), PSTN (Public Switched Telephone Network), etc. The network 10 may alternatively connect directly to the gateway 46 using dial connections 50b or 50c. Further, the wireless network 42 and network 44 may connect to one or more other networks (not shown), in an analogous manner to that depicted in FIG. 2.

Software programming code which embodies the present invention is typically accessed by the microprocessor 12 of the workstation 10 and gateway 46 or server 47 from long-term storage media 30 of some type, such as a CD-ROM drive or hard drive. The software programming code may be embodied on any of a variety of known media for use with a data processing system, such as a diskette, hard drive, or CD-ROM. The code may be distributed on such media, or may be distributed to users from the memory or storage of one computer system over a network of some type to other computer systems for use by users of such other systems. Alternatively, the programming code may be embodied in the memory 28, and accessed by the microprocessor 12 using the bus 14. The techniques and methods for embodying software programming code in memory, on physical media, and/or distributing software code via networks are well known and will not be further discussed herein.

A user of the present invention may connect his or her computer to a server using a wireline connection, or a wireless connection. Wireline connections are those that use physical media such as cables and telephone lines, whereas wireless connections used media such as satellite links, radio frequency waves, and infrared waves. Many connections techniques can be used with these various media, such as: using the computer's modem to establish a connection over a telephone line; using a LAN card such as Token Ring or Ethernet; using a cellular modem to establish a wireless connection; etc. The user's computer may be any type of computer processor, including laptop, handheld or mobile computers; vehicle-mounted devices; desktop computers; mainframe computers; etc., having processing and communication capabilities. The remote server, similarly, can be one of any number of different types of computer which have processing and communication capabilities. These techniques are well known in the art, and the hardware devices and software which enable their use are readily available. Hereinafter, the user's computer will be referred to equivalently as a "workstation", "device", or "computer", and use of any of these terms or the term "server" refers to any of the types of computing devices described above.

In the preferred embodiments, the present invention is implemented as computer software, although an embodiment in hardware or in a combination of hardware and software may be used alternatively. The invention provides a novel technique for synchronizing security credentials among different directories, operating system platforms, and/or registries (discussed collectively herein as different "registries"). There is no requirement that the registry stores the security credentials in plaintext form, nor that the registry provides a way to access an original value from which a particular user's stored credentials were created. The term "password" is used herein as an example of the type of original value which is contemplated, although this is merely for purposes of illustration and not of limitation.

According to the preferred embodiments, one registry is considered a "master" registry, meaning that security credentials in order registries are to be updated based on the security credential value or values in this master. As will be obvious to one of skill in the art, there may be more than one master from which security credential exchanges may be initiated, and one master may be used to update another.

Solutions are provided herein to address two distinct scenarios for synchronizing user credentials. In the first scenario, a user's security credentials are stored at the master registry, and the user knows the password used to create those credentials. This scenario is addressed in a first preferred embodiment of the invention which enables the user to securely propagate his/her credentials to one or more other registries. In a second scenario, the user's security credentials at the master are to be set for the first time, or reset to a new value. A second preferred embodiment of the invention enables an authentication process to be used when performing this setting or resetting process at the master, to ensure that an imposter cannot change the user's credentials and thereby compromise the system's protected resources. (Note that references herein to a user initiating the propagation or setting/resetting process are intended to include other authenticating principals in addition to the user whose credentials are being authenticated, such as a systems administrator who knows the user's shared secret which is used to authenticate the user to a registry, or an authenticating server which knows the user's shared secret, etc.)

In both preferred embodiments, the user's password is collected from the user again (i.e. as a prerequisite to the propagation from the master, and as a prerequisite to the setting/resetting in the master, which is hereinafter referred to as "setting"). This password is validated against a value which has been previously stored in a trusted registry, which is the master registry for the first preferred embodiment of the invention and a registry other than the master for the second preferred embodiment of the invention. If the validation succeeds, the synchronization operation is performed. If it does not, then this user is prevented from propagating or altering the stored credentials. When a propagated plaintext password is received at one or more target registries, the existing security procedure for that registry (e.g. hashing or encryption) is performed on the password value before it is stored, enabling the propagation to distribute the user's permissions in a manner that provides uninterrupted, seamless execution for the user.

According to the preferred embodiments of the present invention, a master registry is configured to have zero or more password synchronization polices or more trust policies. A password synchronization policy indicates which password values of a particular user are to be propagated to which target registries during a synchronization operation. (Note that the value of the user's password for accessing the master registry does not necessarily coincide with the password value(s) for other registries which may be stored therein, where those other passwords have been securely stored in the master registry using the user's master registry access password.) A trust policy indicates that a registry other than the master is to be trusted to correctly authenticate the user. Synchronization and trust policies may be associated with individual users, with groups of users, or with the master registry as a whole.

Note that while the present invention is described herein as being invoked by an individual user to synchronize the security credentials for that user, it may also be used to synchronize credentials for groups of users when the synchronization process is initiated by a user (such as a systems administrator) who is authenticated as having permission for this process.

Figure 3:
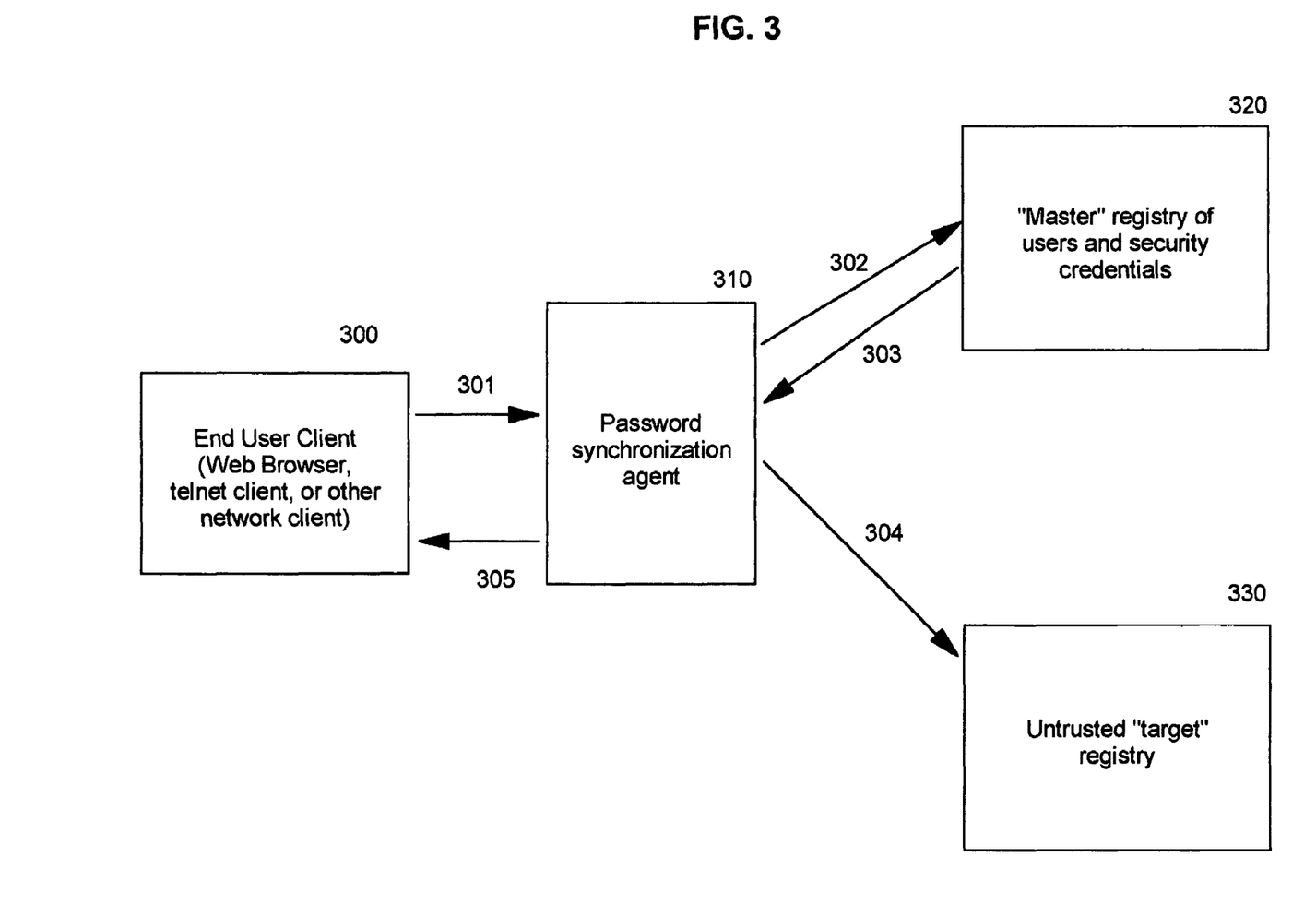
FIG. 3 illustrates the flow of messages between components as a user propagates his/her security credentials which have been previously stored in a master registry to a different target registry, such that the credentials remain synchronized between the master and target registries, according to a first preferred embodiment of the present invention.
Figure 4:
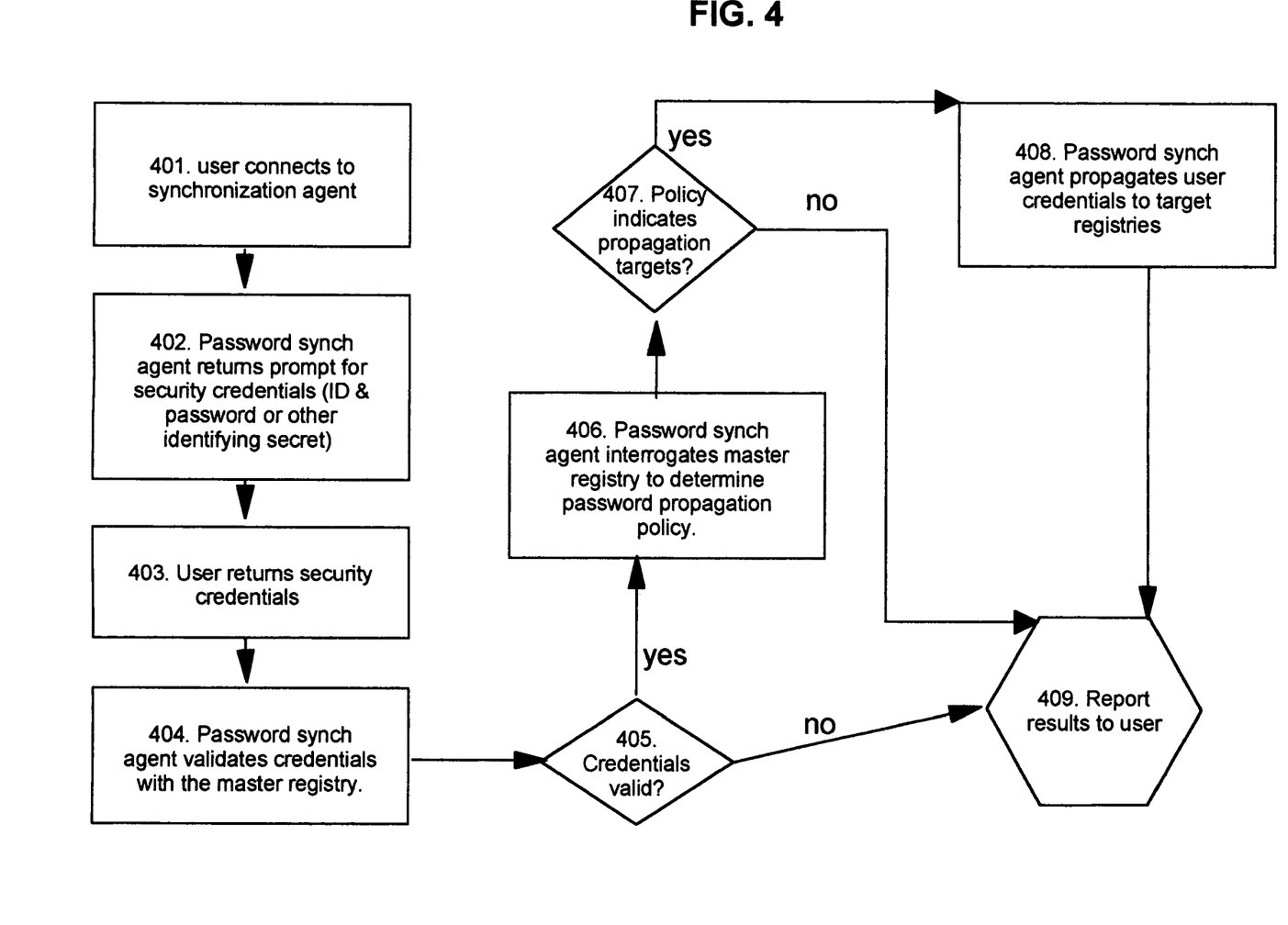
FIG. 4 depicts a flow chart which sets forth a preferred embodiment of the logic involved in implementing the scenario illustrated in FIG. 3.
Figure 5:
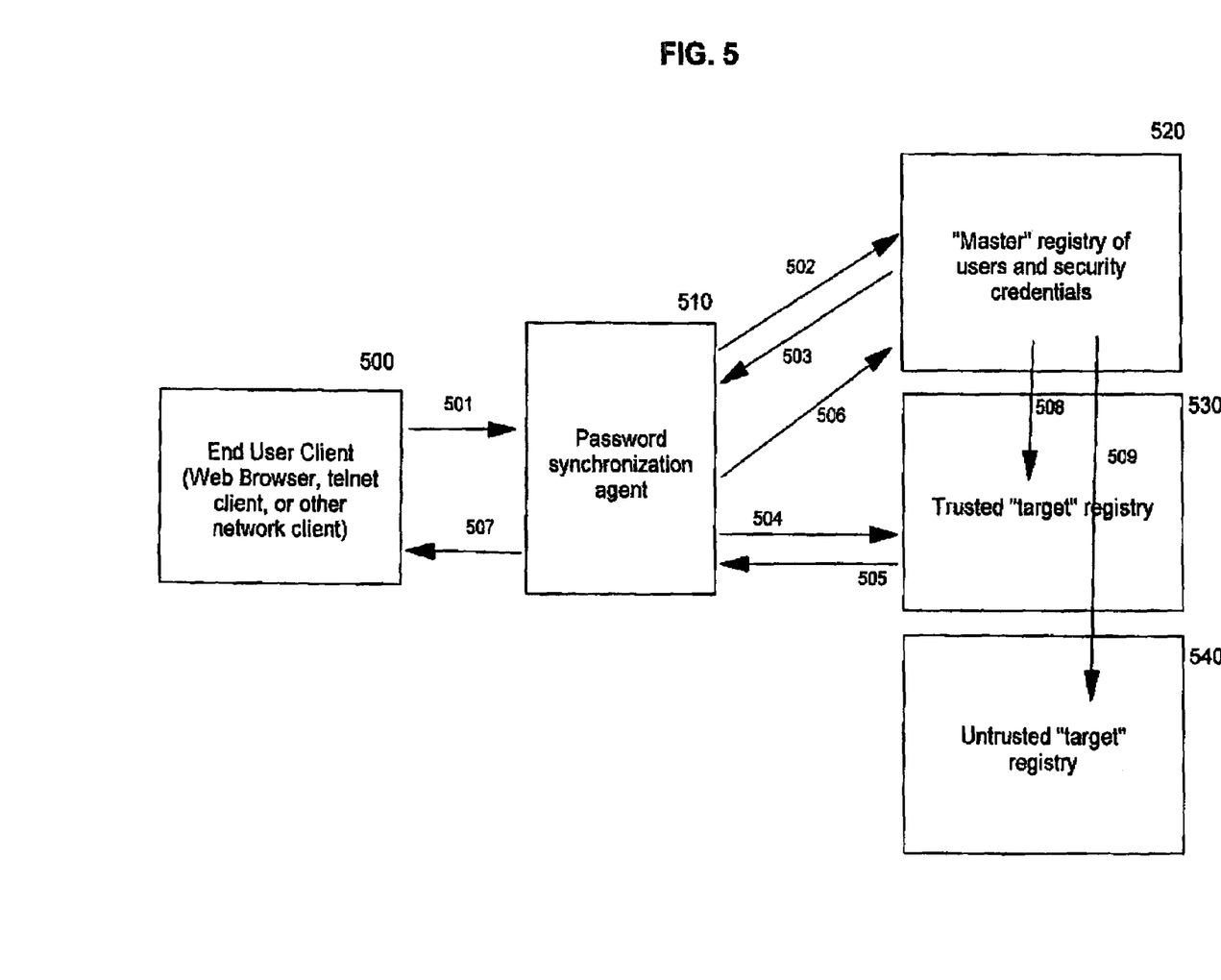
FIG. 5 illustrates the flow of messages between components as a user sets his/her security credentials in a master registry, using a different trusted registry to authenticate that this user is authorized to perform this process, according to a second preferred embodiment of the present invention.
Figure 6:
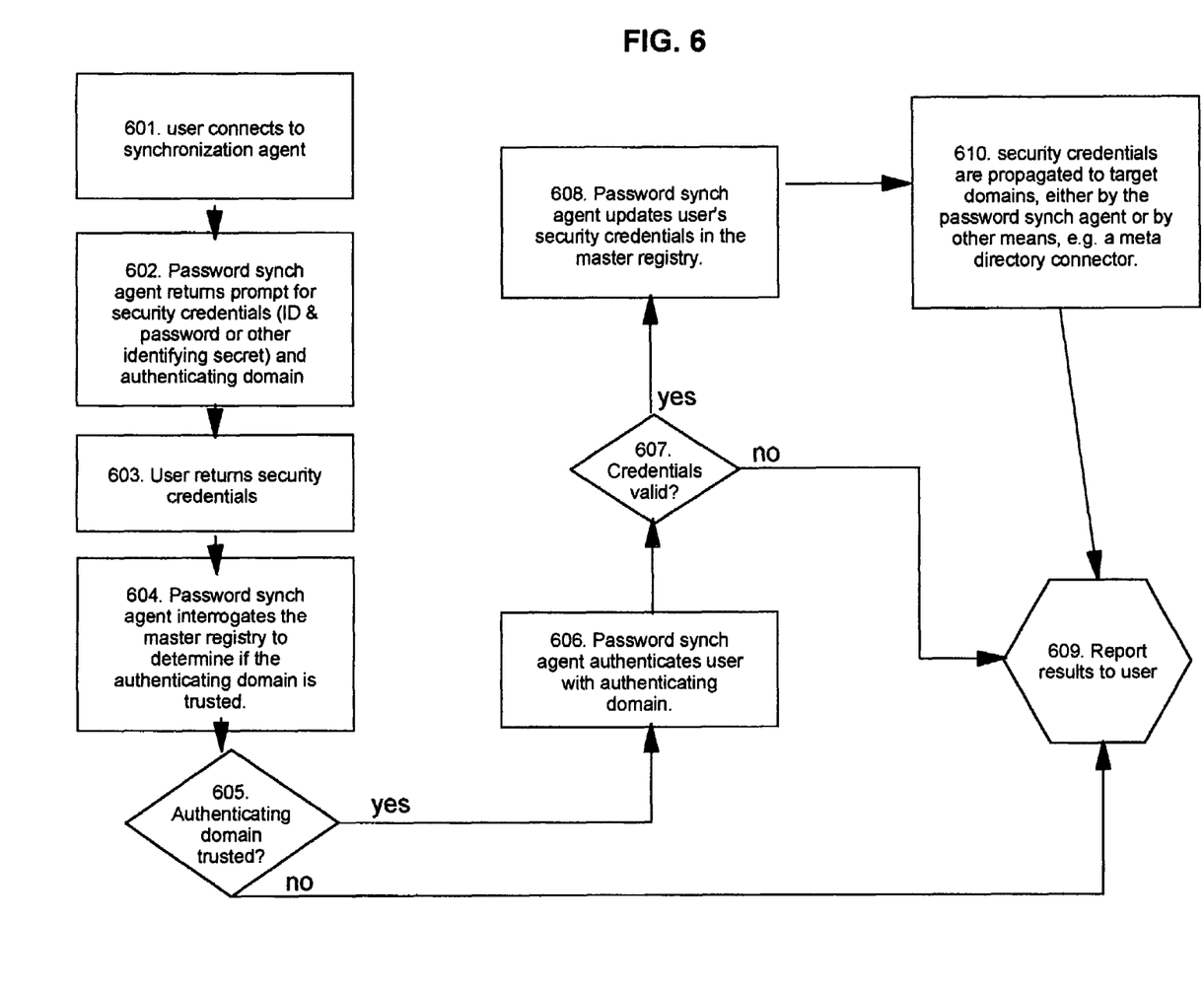
FIG. 6 depicts a flow chart which sets forth a preferred embodiment of the logic involved in implementing the scenario illustrated in FIG. 5.

The preferred embodiments of the present invention will now be described in more detail with references to FIGS. 3–6. FIGS. 3 and 4 illustrate operation of the first preferred embodiment, and FIGS. 5 and 6 illustrate operation of the second preferred embodiment.

FIRST PREFERRED EMBODIMENT

In the first scenario where the user wishes to propagate his/her credentials from the master registry and knows the associated password value which will authenticate the user to the master registry, prior art techniques do not provide a means for interrogating the master to programmatically synchronize the multiple registries. The registries which are the target of the synchronization may have no previously-stored credentials for this user, or the user may wish to replace any credentials previously stored there in order to synchronize multiple sets of credentials. Thus, the first preferred embodiment of the present invention provides a technique for authenticating the user using the master registry, after which the user's credentials can be propagated as desired. As shown in FIG. 3, a client program 300 (e.g. a web browser, telnet client, or similar program) is used to establish a connection 301 from the user's machine to a password synchronization agent function or program 310. For security reasons, this connection should be protected via encryption and the server on which the password synchronization agent executes should provide positive authentication of its identity to the client. Means for this encryption and server authentication are well known to practitioners of the art, with one common means being Secure Sockets Layers (SSL). (Note that use of the term "program" herein is not intended to imply use of a stand-alone program which is dedicated to performing a particular function. The password synchronization agent 310, for example, may be implemented as one or more modules of another program having a broader scope than that described herein, and similarly for client program 300.)

The user's security credentials (e.g. a user ID and password) for the master registry are then obtained and transmitted over this connection to the password synchronization agent. The agent then validates 302, 303 these credentials with the master registry 320. As an example of the validation process, suppose the master registry information is stored in an LDAP directory. The user's security credentials are used to perform a Bind (i.e. log-on) to the directory. If this Bind is successful, then the user is authenticated.

If the validation process is successful, the agent checks the master registry to see if there are password synchronization policies on which the agent should act. Such policies may be configured on a per-user basis, or for the entire master registry, or for subsets of the entries in that registry, as previously discussed. If a policy is configured which applies to the entry for the current user, then the synchronization agent connects 304 to one or more target registries 330 and propagates the user's password (or other security credential(s)) to those registries. Note that in this preferred embodiment, the agent 310 must be configured to have administrative authority for the target registries in order to perform this update process, and must authenticate itself to those registries using credentials with which it has been configured. Connections between the password synchronization agent and the master and/or target registries should be protected by encryption and authentication of the target server, to protect the process from malicious intruders on the network. After the process of password synchronization completes, the results of the process are returned 305 to the user.

The logic with which this process operates is depicted in more detail in FIG. 4. At 401, the user initiates the synchronization process by connecting to the synchronization agent. The agent then prompts the user (402) to enter his/her security credentials. The user provides those credentials (403), and the agent then performs the validation by communicating with the master registry (404). A test is made to determine whether the validation was successful (405); if not, an error is preferably reported to the user (409). The user may be given another chance to re-enter the credentials, if desired (not shown in FIG. 4); preferably, a relatively low upper limit is imposed on the number of times the user is allowed to retry the operation, in order to prevent security exposures such as brute force attacks. When the validation was successful, the password synchronization policy is interrogated (406) to see (407) if this user's credentials are to be propagated to one or more other registries. If so, then the credentials which the user entered at 403 are forwarded to those target registries (408). A message is preferably provided to the user (409) indicating that the propagation has occurred, or that there were no propagation targets registered. The processing of FIG. 4 then ends.

SECOND PREFERRED EMBODIMENT

In the second scenario where the user wishes to set his/her credentials in the master registry, it is assumed that a different registry exists which is trusted and which has stored credentials for this user. The user may have no previously-stored credentials at the master, or the user may wish to replace any credentials previously stored there (perhaps because the user has forgotten the password value used those credentials) with those stored in the trusted registry in order to synchronize the two sets of credentials. This second preferred embodiment of the present invention assumes that means exist for communicating with the trusted registry to validate a particular user's ID and password. That trusted registry is used to validate that the user is authorized to set his/her credentials in the master.

As shown in FIG. 5, the user connects 501 to the password synchronization agent 510 using a web browser, telnet client, or other similar client program 500. As in the first preferred embodiment described above, this connection between the user client and the password synchronization agent should be encrypted and the password synchronization agent should be authenticated to the client, using SSL or similar means. The user's ID and password (or other secret identifying information) are sent to the password synchronization agent over this secure connection. The user may also explicitly specify the authenticating domain (meaning a trusted target registry 530 to be used in authenticating the user) as part of this transmission, or trust policies within the master registry 520 may identify that trusted registry 530. The password synchronization agent then connects to the master registry to look up the trust and password synchronization policies (502, 503). As described for the first preferred embodiment, these may be specified on a per-user basis, or for the entire master registry, or for subsets of the entries in the master registry. The password synchronization agent looks in the master registry for a trust policy that applies to the current user. If: (a) such policy is found, and (b) it indicates that the authenticating domain indicated by the user is a trusted registry for that user's entry in the master registry, or (c) the user did not specify the authentication domain but the policy does, then the password synchronization agent authenticates the user with the trusted registry (504, 505). If this authentication succeeds, the password synchronization agent updates 506 the user's password (or other secret security credential) in the master registry. It then reports 507 the results to the user. The user's password or security credential may then be updated in other target registries, either by the password synchronization agent itself or by the update process of a meta-directory connector of the type which has been previously described (508, 509). In the preferred embodiment, the password synchronization agent must be configured with an administrative identity and corresponding authentication credential for the master registry, and if the password synchronization agent itself performs password updates for target registries, it must be configured with an administrative identity and corresponding authentication credential for these as well. All connections between the password synchronization agent and the master, trusted, and target registries should be protected by encryption and by an authentication process for each target server, via SSL or similar means.

The logic with which this process operates is depicted in more detail in FIG. 6. At 601, the user initiates the synchronization process by connecting to the synchronization agent. The agent then prompts the user (602) to enter his/her security credentials, and when the user is to explicitly enter an identification of the trusted domain, for that domain information as well. The user provides the requested information (603), and the agent then interrogates the master registry (604) to determine if the authenticating domain is trusted. (Or, in the case where the user is not responsible for identifying the authenticating domain, the password synchronization agent requests that information from the master.) A test is made to determine whether the authenticating domain is trusted (605); if not, an error is preferably reported to the user (609). If the user is responsible for identifying the domain, the user may be allowed to select another, if desired for a particular implementation of the present invention, in which case control returns to 602 (not shown in FIG. 6). Preferably, a relatively low upper limit is placed on the number of times the user is allowed to re-enter the authenticating domain information, such as a maximum of three attempts. Upon determining that an authenticating domain is trusted, the password synchronization agent authenticates the user with that domain (606). A determination is then made as to the result of this process (607). If the credentials are not valid, then an error message is preferably returned to the user (609), and the user may be given another chance to re-enter the credentials, as described above with reference to FIG. 4. When the credentials have been determined to be valid, the password synchronization agent updates the user's security credentials in the master (608). The credentials may be set to match the value known to the authenticating domain, which the user has entered at 603, or they may be set to some other value if desired (for example, by prompting the user to explicitly enter credentials to use, now that the user is known to have authority for this update process). If the password synchronization policy at the master registry indicates that this user's credentials are to be propagated to other target registries, then the propagation is performed (610). A message is preferably provided to the user (609) indicating that the master has been updated and that the propagation has occurred, as applicable. The processing of FIG. 6 then ends.

In the preferred embodiments of the present invention, the client software with which the user interacts with the present invention may be designed using a Web browser interface. The password synchronization agent may be implemented as a servlet which executes on a Web server. While the figures used in describing the preferred embodiments show the password synchronization agent as a component separate from the registries, this is for purposes of illustration and not of limitation: the agent may actually reside on the same device with one or more of the registries. In that case, a secure network connection from the agent to the registry is not required; instead, interprocess protection techniques which are known in the art may be used to secure the information flow.

While the preferred embodiment of the present invention has been described, additional variations and modifications in that embodiment may occur to those skilled in the art once they learn of the basic inventive concepts. Therefore, it is intended that the appended claims shall be construed to include both the preferred embodiment and all such variations and modifications as fall within the spirit and scope of the invention.

What is claimed is:

1. In a computing environment having a plurality of secure network connections, a computer program product for securely propagating security credentials using a trusted authenticating domain, the computer program product embodied on one or more computer-readable media and comprising:

computer-readable program code means for receiving, by a password synchronization agent ("PSA") from a user at a client device over a first secure connection between the client device and the PSA on which the PSA has authenticated itself to the client device, a password propagation request providing an identifier of the user and an identifying secret of the user;

computer-readable program code means for forwarding, by the PSA to a trusted authenticating domain over a second secure connection therebetween on which the trusted authenticating domain has authenticated itself to the PSA, the received user identifier and identifying secret, wherein the trusted authenticating domain stores identifying secrets for user identifiers only as secured, non-recoverable versions thereof;

computer-readable program code means for receiving, by the PSA from the trusted authenticating domain over the second connection, a validation result created by the trusted authenticating domain responsive to the forwarding, the validation result being a successful result if it indicates that the trusted authenticating domain had previously stored, for the user identifier, a secured version of the identifying secret; and computer-readable program code means for propagating, if the validation result is the successful result, the received user identifier and identifying secret from the PSA to a master registry over a third mutually-authenticated secure connection therebetween, such that the master registry can store, for the user identifier, a secured version of the identifying secret, wherein the secured version stored by the master registry is not required to be identical to the secured version stored at the trusted authenticating domain.

2. The computer program product according to claim 1, further comprising computer-readable program code means for propagating code means for propagating, if the validation result is the successful result, the received identifying secret from the PSA to one or more target registries over fourth mutually-authenticated secure connections, each of the fourth connections being between the PSA and a distinct one of the target registries, such that the each target registry can store, for the user identifier, a secured version of the identifying secret.

3. The computer program product according to claim 1, wherein the password propagation request further provides an identification of the trusted authenticating domain; and further comprising computer-readable program code means for verifying that the trusted authenticating domain is trusted by the master registry as a prerequisite to the propagating.

4. The computer program product according to claim 1, further comprising:

computer-readable program code means for obtaining, by the PSA using the third connection, an identification of the trusted authenticating domain from the master registry as a prerequisite to the forwarding.

5. The computer program product according to claim 3, wherein the master registry stores trust policy information, and wherein the computer-readable program code means for verifying that the trusted authenticating domain is trusted further comprises a computer-readable program code means for checking whether the stored trust policy information for the user identifier includes the trusted authenticating domain identification provided in the password propagation request.

6. The computer program product according to claim 3, wherein the master registry stores trust policy information, and wherein the computer-readable program codfe means for verifying that the trusted authenticating domain is trusted further comprises computer-readable program code means for checking whether the stored trust policy information for a user group of which the user identified by the user identifier is a member includes the trusted authenticating domain identification provided in the password propagation request.

7. The computer program product according to claim 4, wherein the master registry stores trust policy information, and wherein the computer-readable program code means for obtaining the identification of the trusted authenticating domain from the master registry further comprises computer-readable program cofde means for obtaining the trusted authenticating domain identification using the stored trust policy information for the user identifier.

8. The computer program product according to claim 4, wherein the master registry stores trust policy information, and wherein the computer-readable program code means for obtaining the identification of the trusted authenticating domain from the master registry further comprises computer-readable program code means for obtaining the trusted authenticating domain identification using the stored trust policy information for a user group of which the user identified by the user identifier is a member.

9. The computer program product according to claim 2, wherein the master registry stores password synchronization policy information, and wherein the computer-readable program code means for propagating the received identifying secret to the one or more target registries further comprises computer-readable program code means for identifying the one or more other target registries using the stored password synchronization policy information for the user identifier.

10. The computer program product according to claim 2, wherein the master registry stores password synchronization policy information, and wherein the computer-readable program code means for propagating the received the received identifying secret to the one or more target registries further comprises computer-readable program code means for identifying the one or more target registries using the stored password synchronization policy information for a user group of which the user identified by the user identifier is a member.

11. The computer program product according to claim 1, wherein the previously-stored secured version of the identifying secret was created, at the trusted authenticating domain, by performing a security function on a previously-received copy of the identifying secret of the user, wherein the security function comprises one of (i) a one-way algorithm or (ii) an encryption algorithm;
wherein the security function is repeated, at the trusted authenticating domain, on the forwarded identifying secret of the user, after which, if a result thereof is identical to the previously-stored secured version, the trusted authenticating domain then creates the successful result.

12. The computer program product according to claim 1, wherein the validation result is created, at the trusted authenticating domain, by invoking an authenticated LDAP bind or other native authentication mechanism of the trusted authenticating domain, using the forwarded user identifier and the identifying secret of the user, and wherein the validation result is created using a result of the LDAP bind or other native authentication mechanism.

13. The computer program product according to claim 1, wherein the PSA has administrative authority for performing operations at the master registry.

14. The computer program product according to claim 2, wherein the PSA has administrative authority for performing operations at the one or more target registries.

15. A system for securely propagating security credentials using a trusted authenticating domain, comprising:
means for receiving by a password synchronization agent ("PSA") from a user at a client device over a first secure connection between the client device and the PSA on which the PSA has authenticated itself to the client device, a password propagation request providing an identifier of the user and an identifying secret of the user;
means for forwarding, by the PSA to a trusted authenticating domain over a second secure connection therebetween on which the trusted authenticating domain has authenticated itself to the PSA, the received user identifier and identifying secret, wherein the trusted authenticating domain stores identifying secrets for user identifiers only as secured, non-recoverable versions thereof;
means for receiving, by the PSA from the trusted authenticating domain over the second connection, a validation result created by the trusted authenticating domain responsive to the forwarding, the validation result being a successful result if it indicates that the trusted authenticating domain had previously stored, for the user identifier, a secured version of the identifying secret; and
means for propagating, if the validation result is the successful result, the received user identifier and identifying secret from the PSA to a master registry over a third mutually-authenticated source connection therebetween, such that the master registry can store, for the user identifier, a secured version of the identifying secret, wherein the secured version stored by the master registry is not required to be identical to the secured version stored at the trusted authenticating domain.

16. The system according to claim 15, further comprising means for propagating, if the validation result is the successful result, the received identifying secret from the PSA to one or more target registries over fourth mutually-authenticated secure connections, each of the fourth connections being between the PSA and a distinct one of the target registries, such that each target registry can store, for the user identifier, a secured version of the identifying secret.

17. The system according to claim 15, wherein the password propagation request further provides an identification of the trusted authenticating domain; and
further comprising means for verifying that the trusted authenticating domain is trusted by the master registry as a prerequisite to the propagating.

18. The system according to claim 15, further comprising:
means for obtaining, by the PSA using the third connection, an identification of the trusted authenticating domain from the master registry as a prerequisite to the forwarding.

19. The system according to claim 17, wherein the master registry stores trust policy information, and wherein the means for verifying that the trusted authenticating domain is trusted further comprises means for checking whether the stored trust policy information for the user identifier includes the trusted authenticating domain identification provided in the password propagation request.

20. The system according to claim 17, wherein the master registry stores trust policy information, and wherein the means for verifying that the trusted authenticating domain is trusted further comprises means for checking whether the stored trust policy information for a user group of which the user identified by the user identifier is a member includes the trusted authenticating domain identification provided in the password propagation request.

21. The system according to claim 18, wherein the master registry stores trust policy information, and wherein the means for obtaining the identification of the trusted authenticating domain from the master registry further comprises means for obtaining the trusted authenticating domain identification using the stored trust policy information for the user identifier.

22. The system according to claim 18, wherein the master registry stores trust policy information, and wherein the means for obtaining the identification of the trusted authenticating domain from the master registry further comprises means for obtaining the trusted authenticating domain identification using the stored trusted policy information for a user group of which the user identified by the user identifier is a member.

23. The system according to claim 16, wherein the master registry stores password synchronization policy information, and wherein the means for propagating the received identifying secret to the one or more target registries further comprises means for identifying the one or more other target registries using the stored password synchronization policy information for the user identifier.

24. The system according to claim 16, wherein the master registry stores password synchronization policy information, and wherein the means for propagating the received identifying secret to the one or more other target registries further comprises means for identifying the one or more target registries using the stored password synchronization policy information for a user group of which the user identified by the user identifier is a member.

25. The system according to claim 15, wherein the previously-stored secured version of the identifying secret was created, at the trusted authenticating domain, by performing a security function on a previously received copy of the identifying secret of the user, wherein the security function comprises one of (i) a one-way hashing algorithm or (ii) an encryption algorithm; and wherein the security function is repeated, at the trusted authenticating domain, on the forwarded identifying secret of the user, after which, if a result thereof is identical to the previously-stored secured version, the trusted authenticating domain then creates the successful result.

26. The system according to claim 15, wherein the validation result is created, at the trusted authenticating domain, by invoking an authenticated LDAP bind or other native authentication mechanism of the trusted authenticating domain, using the forwarded user identifier and the identifying secret of the user, and wherein the validation result is created using a result of the LDAP bind or other native authentication mechanism.

27. The system according to claim 15, wherein the PSA has administrative authority for performing operations at the master registry.

28. The system according to claim 16, wherein the PSA has administrative authority for performing operations at the one or more target registries.

29. A computer-implemented method for securely propagating security credentials using a trusted authenticating domain, comprising steps of:

receiving, by a password synchronization agent ("PSA") from a user at a client device over a first secure connection between the client device and the PSA on which the PSA has authenticated itself to the client device, a password propagation request providing an identifier of the user and an identifying secret of the user;

forwarding, by the PSA to a trusted authenticating domain over a second secure connection therebetween on which the trusted authenticating domain has authenticated itself to the PSA, the received user identifier and identifying secret, wherein the trusted authenticating domain stores identifying secrets for user identifiers only as secured, non-recoverable versions thereof;

receiving, by the PSA from the trusted authenticating domain over the second connection, a validation result created by the trusted authenticating domain responsive to the forwarding, the validation result being a successful result if it indicates that the trusted authenticating domain had previously stored, for the user identifier, a secured version of the identifying secret; and propagating, if the validation result is the successful result, the received user identifier and identifying secret from the PSA to a master registry over a third mutually-authenticated secure connection therebetween, such that the master registry can store, for the user identifier, a secured version of the identifying secret.

30. The computer program product according to claim 1, further comprising:

computer-readable program code means for obtaining a new value from the user to be used as the propagated identifying secret if the validation has the successful result; and computer-readable program code means for substituting the new value for the received identifying secret prior to operations of the computer-readable program code means for propagating.

31. The system according to claim 15, further comprising:

means for obtaining a new value from the user to be used as the propagated identifying secret if the validation has the successful result; and means for substituting the new value for the received identifying secret prior to operation of the means for propagating.

32. The method according to claim 29, further comprising steps of:

obtaining a new value from the user to be used as the propagated identifying secret if the validation has the successful result; and substituting the new value for the received identifying secret prior to operation of the propagating step.

33. The method according to claim 29, wherein the forwarding and receiving steps use secure interprocess communications between the PSA and the trusted authenticating domain instead of the second connection.

34. The method according to claim 29, wherein the second version stored by the master registry is not required to be identical to the secured version stored at the trusted authenticating domain.

* * * * *

UNITED STATES PATENT AND TRADEMARK OFFICE
CERTIFICATE OF CORRECTION

PATENT NO. : 6,986,039 B1  Page 1 of 1
APPLICATION NO. : 09/614087
DATED : January 10, 2006
INVENTOR(S) : Robert C. Leah et al.

It is certified that error appears in the above-identified patent and that said Letters Patent is hereby corrected as shown below:

Column 16, line 16:
Replace "source" with --secure--

Column 18, line 50:
Replace "second" with --secured--

Signed and Sealed this

Thirteenth Day of April, 2010

David J. Kappos
*Director of the United States Patent and Trademark Office*